United States Patent [19]
Winder

[11] Patent Number: 5,190,081
[45] Date of Patent: Mar. 2, 1993

[54] DEVICE FOR TRANSFERRING FLUID FROM A BAG INTO A FLUID RESERVOIR

[76] Inventor: D. H. Winder, 25 Wendell Ave., Weston, Ontario, Canada, M9W 3K6

[21] Appl. No.: 709,260

[22] Filed: Jun. 3, 1991

[51] Int. Cl.$^5$ .............................................. B65B 47/36
[52] U.S. Cl. ....................................... 141/1; 141/114; 141/329; 141/313; 141/363; 141/375; 222/83; 222/87; 222/81
[58] Field of Search ............... 141/329, 330, 114, 313, 141/314, 98, 10, 363-366, 375; 222/81, 83, 83.5, 87, 88

[56] References Cited

U.S. PATENT DOCUMENTS

| | | | |
|---|---|---|---|
| 1,028,542 | 6/1912 | Christian | 141/330 |
| 1,635,563 | 7/1927 | Sanford | 222/83.5 X |
| 2,017,818 | 10/1935 | Reynolds | 141/330 |
| 2,083,479 | 6/1937 | Speare . | |
| 2,107,995 | 2/1938 | Statham et al. | 141/330 X |
| 2,111,715 | 3/1938 | Winfree | 141/364 |
| 2,116,918 | 5/1938 | Walker | 222/83.5 |
| 2,350,836 | 6/1944 | Sonneborn | 222/84 |
| 3,288,178 | 11/1966 | Johnson | 141/330 |
| 3,804,134 | 4/1974 | Wehking | 141/98 |
| 4,322,019 | 3/1982 | Smith | 222/83.5 |
| 4,676,281 | 6/1987 | Nord | 141/1 |

FOREIGN PATENT DOCUMENTS

| | | | |
|---|---|---|---|
| 1045084 | 12/1978 | Canada | 222/81 |
| 1267615 | 5/1968 | Fed. Rep. of Germany | 222/81 |
| 643590 | 8/1962 | Italy | 141/330 |

Primary Examiner—Ernest G. Cusick

[57] ABSTRACT

A device for assisting in the transfer of fluid from a bag into a fluid reservoir. The device includes a generally upstanding member dimensioned to receive the fluid bag. The container has an open top and fluidly communicates with the interior of a reservoir. A bag support extends across the container in a non-fluidly sealed manner. A fixed cutter is provided having a blade facing a side of the container. The fluid bag is provided with a fluid encircled sealed opening which is placed over the cutter and drawn toward a blade on the cutter to sever the bag and allow fluid to escape past the bag support and into the reservoir.

11 Claims, 2 Drawing Sheets

DEVICE FOR TRANSFERRING FLUID FROM A BAG INTO A FLUID RESERVOIR

FIELD OF THE INVENTION

This invention relates to devices for assisting in the transfer of fluid from a bag into a fluid reservoir.

BACKGROUND OF THE INVENTION

Most automobiles have a windshield washer system which dispenses a fluid from a fluid reservoir through a jet onto the windshield. When it is expected that the vehicle will be operated in below freezing conditions, the fluid reservoir for the windshield washing system is generally filled with an alcohol solution referred to as "windshield washer fluid" which will not freeze if sprayed onto a cold windshield. Windshield washer fluid has up to now generally been sold in plastic bottles of approximately 4 liters capacity.

A typical windshield washer fluid reservoir has an opening of approximately two inches diameter which makes filling somewhat difficult in view of the size of typical windshield washer fluid bottles. The filling of windshield washer fluid reservoirs is further complicated by the fact that they are generally located in the engine compartment of an automobile and are surrounded by various structures that prevent the windshield washer fluid bottle from being placed close to the filling opening of the reservoir.

It is an object of the present invention to provide a device which facilitates the filling of a windshield washer fluid reservoir.

It is a further object of the present invention to provide such a device which accepts windshield washer fluid in plastic bags.

It is a still further object of the present invention to provide such a device which is both easy and safe to use.

SUMMARY OF THE INVENTION

A device is provided for transferring fluid from a bag into a fluid reservoir, said bag having a fluid encircled sealed opening extending therethrough adjacent an edge thereof, said device comprising:
 a generally upstanding container being dimensioned to receive said fluid bag, having an open top and fluidly communicating with the interior of said reservoir;
 a fluid permeable bag support extending across said container below said top; and,
 a cutter extending upwardly from said bag support adjacent a side of said container and having a blade facing said side;
to enable a user of said device to place a bag on said bag support with said cutter extending through said opening and pull said bag away from said blade to sever said bag and allow fluid from said bag to flow past said bag support, through said structure and into said reservoir.

A bag is also provided for storing liquids comprising:
 a continuous wall portion sealed at both ends to define an enclosure; and,
 corresponding openings through opposite sides of said wall portion, said corresponding openings being sealed together to define an opening through said enclosure which is encircled by said enclosure.

DESCRIPTION OF THE DRAWINGS

A preferred embodiment of the present invention is described below with reference to the attached drawings in which.

DETAILED DESCRIPTION OF THE PREFERRED EMBODIMENTS

Figure 1:
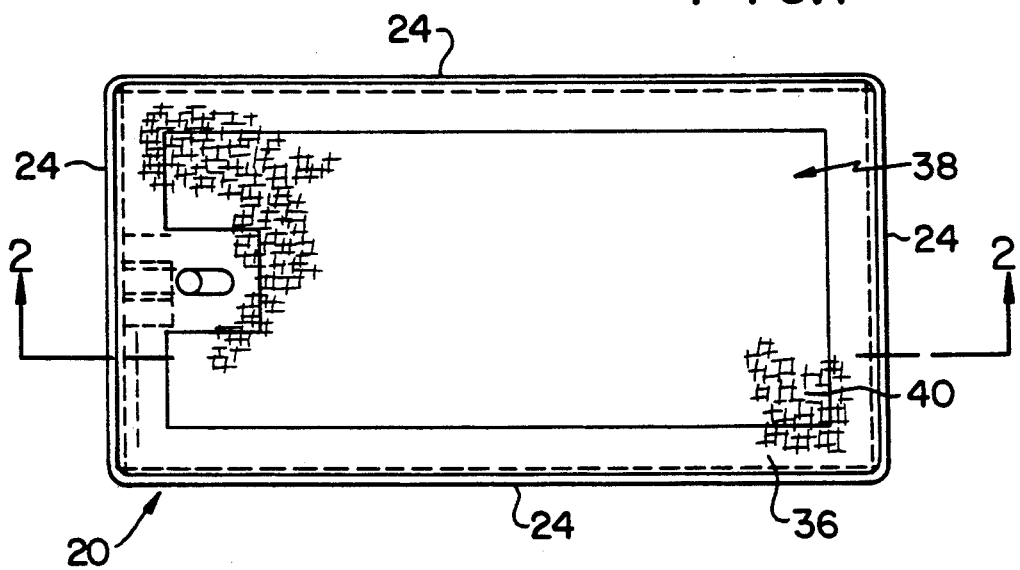
FIG. 1 is a top plan view of a device according to the present invention with the top removed.

A device 20 according to the present invention is illustrated in FIGS. 1 through 4. The device 20 includes a generally upstanding container 22 which is defined by four opposed sidewalls 24. The container 22 has an open top 26 which may be covered by a lid 28 shown in FIGS. 2, 3 and 4 but omitted from FIG. 1 for clarity. The lid 28 is attached to one of the sides 24 by a hinge 30 which extends along that side 24. A fluid reservoir (not shown) would be provided beneath the bottom 32 of the container 22.

A device 20 according to the present invention may be formed as part of a fluid reservoir or may be connected to a remote fluid reservoir through a suitable conduit. The bottom 32 of the container 22 thus provides fluid communication means for directing the fluid to the fluid reservoir.

A bag support 34 extends across the container 22 below the top 26. The bag support 34 includes a generally rectangular frame 36 which runs along the sidewalls 24 of the container 22 and defines a generally rectangular opening 38 in FIG. 1. A screen 40 supported by the frame 36 extends across the rectangular opening 38. The bag support 34 provides a structure on which a bag 42 in FIG. 3 may be placed within the upper part of the container 22. Furthermore, by virtue of the screen 40, the bag support 34 is fluid permeable as fluid can pass the bag support by flowing through the openings in the screen 40.

Figure 2:
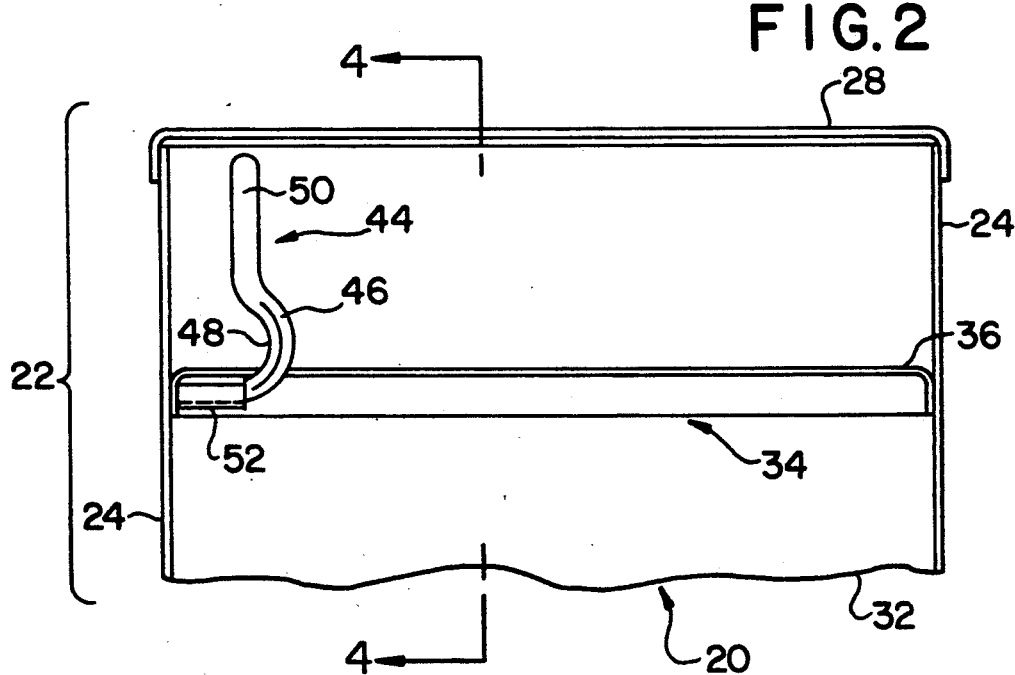
FIG. 2 is a sectional view on line 2-2 device of FIG. 1.
Figure 4:
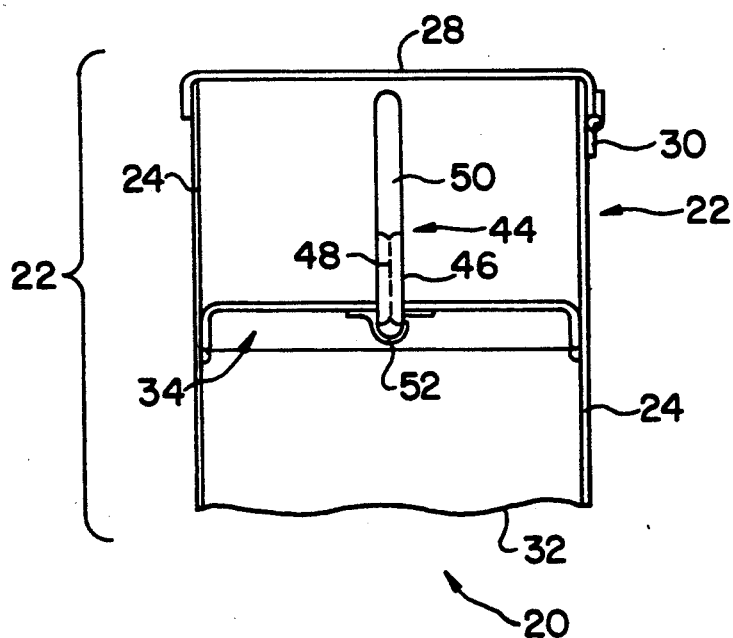
FIG. 4 is a sectional view on line 4—4 of FIG.

A cutter 44 extends upwardly from the bag support 34. The cutter has a curved portion 46 the inside part of which is sharpened to define a generally arcuate blade 48 facing the adjacent wall 24. The curved portion 46 of the cutter 44 extends through the bag support 34 as best shown in Figs. 2 and 4. The cutter 44 also has a straight portion 50 extending upwardly from the curved portion 46 and generally parallel to the adjacent side 24. The curved portion 46 of the cutter 44 is mounted in a socket 52 on the underside of the frame 36 of the bag support 34. Other suitable ways of mounting the cutter 44 may be used. For example, the cutter 44 may be attached directly to the side 24 adjacent to it.

Figure 3:
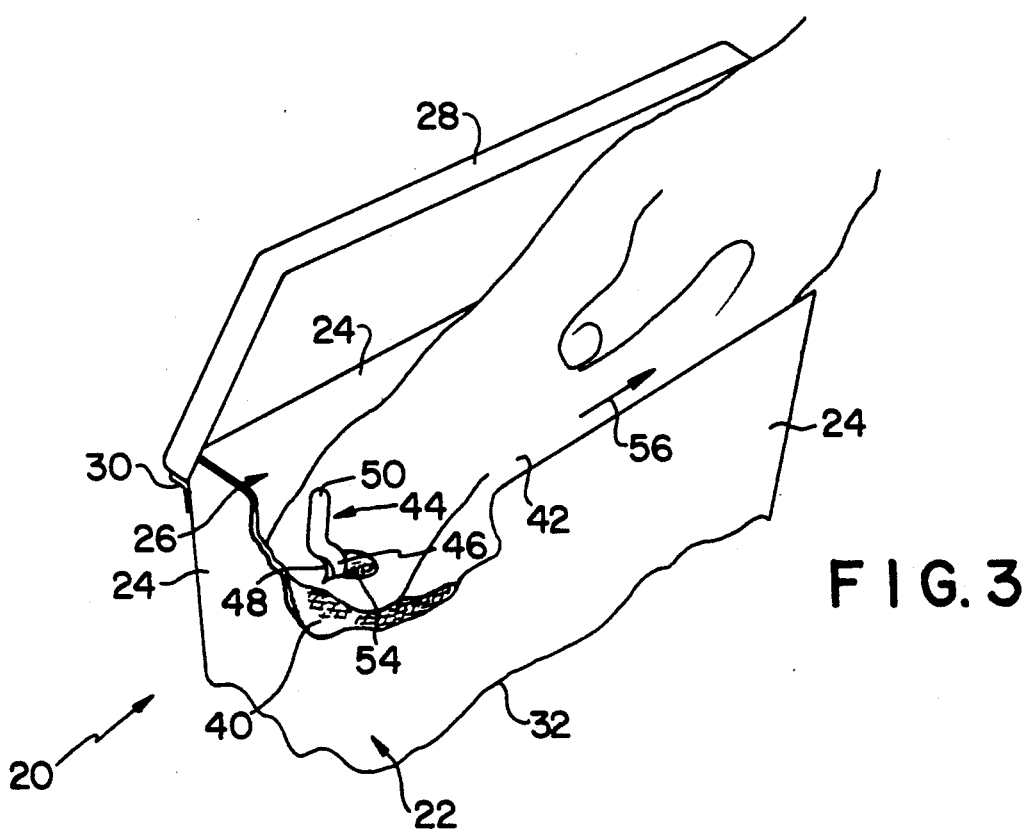
FIG. 3 is a perspective view of a device according to the present invention in use.

The device 20 as illustrated in FIG. 3, is intended for use with a fluid bag 42 having a fluid encircled opening 54 extending through it. In use, the opening 54 is placed over the straight portion 50 of the cutter 44 and urged toward the bag support 34 using the straight portion 50 as a guide. Once the opening 54 has been passed far enough along the cutter 44 to encounter the blade 48, the fluid bag 42 is pulled away from the blade 48 in the direction of arrow 56 in FIG. 3 to cause the blade 48 to sever the bag adjacent the opening 54. Once the bag has been severed, fluid from within the bag will escape past the severed portion, pass through the screen 40 of the bag support 34, be filtered by the screen and flow into a reservoir fluidly communicating with the bottom 32 of the device 20.

An advantage of the device 20 of the present invention is that the upper part of the container 22 is dimensioned to receive a fluid bag 42 so that once the bag has been severed, fluid from the bag will flow into the reservoir without any requirement to fluidly seal the severed opening to the device to prevent fluid from escaping out of the device. A further advantage of the device 20 is that the blade 48 of the cutter 44 does not face the opening 26 but rather faces an adjacent sidewall 24. This reduces the possibility of injury to the user if the user places their hand within the container 22. The straight portion 50 of the cutter 44 also helps to shield against unintentional contact with the blade 48.

The above description should be interpreted in an illustrative rather than a restrictive sense. Variations to the present invention may be apparent to those skilled in the relevant art without departing from the spirit and scope of the present invention which is defined in the claims set out below. For example, if screening or filtering of the fluid is not desired, the bag support may be made from a perforated sheet or a grid with relatively large openings. Furthermore, although a rectangular container has been illustrated, other suitable shapes such as cylindrical, oval, etc. may be used.

I claim:

1. A method for transferring fluid from a fluid filled sealed bag having a passage therethrough to a fluid reservoir, comprising the steps of:
   (a) placing said bag within a generally upstanding container having an open top and at least one side wall with a cutter therein having at a lower portion a blade which closely faces said at least one side wall and at an upper portion a guide which is free of sharp edges, said container also having fluid communication means below said blade for directing said fluid to said reservoir;
   (b) lowering said bag with said guide passing through said bag passage and directing said bag to a position adjacent said blade of said cutter;
   (c) pulling said bag upon said blade to cut open said bag and thereby allow said fluid to flow out of said bag;
   (d) draining said fluid out of said bag, through said fluid communication means to said reservoir.

2. A device adapted to transfer fluid from a fluid filled sealed bag having a passage therethrough to a fluid reservoir, said device comprising:
   a generally upstanding container dimensioned to receive such a bag, having an open top and at least one side wall;
   a bag support extending within said container below said top, and being permeable to such fluid;
   a cutter to open such a bag, said cutter being positioned above said bag support and having a blade which faces said at least one side wall and is proximal thereto;
   a guide for facilitating positioning of such a bag to a cutting position, said guide extending upwardly above said cutter and being dimensioned to be received through the passage of such a bag;
   fluid communication means below said bag support for directing such fluid to said reservoir;
   said guide, said bag support and said cutter being in spaced relationship within said container such that in use such a bag may be lowered onto said bag support with said guide passing through the passage of the bag, directing the bag to a position adjacent said blade of said cutter, whereupon the bag may be pulled upon said blade to cut open the bag and thereby allow such fluid to flow out of the bag and thence through said bag support and said fluid communication means to said reservoir.

3. The device of claim 2 wherein said guide comprises an upward extension of said cutter.

4. The device of claim 3 further comprising means extending above and interiorly of said blade for shielding against unintentional contact of said blade.

5. The device of claim 4, wherein said means for shielding against unintentional contact of said blade comprises said upward extension of said cutter.

6. The device of claim 5 wherein the blade of said cutter is generally arcuate.

7. The device of claim 2, 3 or 6 further comprising filtering means extending within said container below said cutter, and being permeable to said fluid.

8. A device adapted to transfer fluid from a fluid filled sealed bag to a fluid reservoir, said device comprising:
   a generally upstanding container having an open top and at least one side wall;
   a cutter extending within said container below said top, having at a lower portion thereof a blade which closely faces said at least one side wall and having at an upper portion thereof a guide which is generally free of sharp edges; and
   fluid communication means below said blade for directing said fluid to said reservoir.

9. The device of claim 8 wherein said guide comprises a generally straight upstanding member.

10. The device of claim 9 wherein said blade of said cutter is generally arcuate.

11. The device of claim 8, 9, or 10 further comprising filter means extending within said container below said cutter, and being permeable to said fluid.

* * * * *